UNITED STATES PATENT OFFICE.

JOHN M. MERRYMON, OF INDIANAPOLIS, INDIANA.

IMPROVEMENT IN THE MANUFACTURE OF PRUSSIAN BLUE.

Specification forming part of Letters Patent No. 45,846, dated January 10, 1865.

*To all whom it may concern:*

Be it known that I, JOHN M. MERRYMON, of Indianapolis, in the county of Marion and State of Indiana, have invented a new and Improved Mode of Manufacturing Prussiate of Potash, or what is commonly known as "Prussian Blue;" and I do hereby declare that the following is a full and exact description of the mode of manufacturing the same.

In order to a better understanding of the same by those skilled in the art, I will state that I make the following solutions in water, each in separate vessels, to wit: First is a solution of one hundred pounds of prussiate of potash; second is a solution of twenty-five pounds of bichromate of potash; third is a solution of two hundred to three hundred pounds of sulphate of iron; fourth is a solution of one hundred pounds of acetate of lead. Now, in order to make a chemically-pure prussiate of iron, I proceed to use these said solutions as follows, to wit: I first pour into the vessel containing the said solution of prussiate of potash, about one-half of the said solution of bichromate of potash, and after stirring it well then gradually add the said solution of sulphate of iron until the proper color is produced. I now deepen the shade of the color, if desired, by adding more of the said solution of bichromate of potash, stirring the while, and then add enough of diluted sulphuric acid to fully neutralize any potash remaining in the solution not in combination, and to enrich and brighten the color produced; and now, after stirring well, I let the color precipitate and proceed with it as in the ordinary way. This color is called "pure Chinese blue," and in commerce is mostly found adulterated with alumina, chalk, or some other substance.

My formula for making what is commercially called "pure Prussian blue" is to the said solution of prussiate of potash add the said solution of acetate of lead and stir well. Then add about one-half of the said solution of bichromate of potash, stirring the while, and then gradually add the solution of sulphate of iron until the proper shade of color is produced; and now, after stirring well, I let the color precipitate and proceed in the ordinary way, not forgetting, however, to add more of the said solution of bichromate of potash and the said diluted sulphuric acid, in the manner and for the purposes as above described.

It will be observed that I use the said solution of bichromate of potash, as in the first formula above described, for the double purpose of oxidizing the said prussiate of iron, when made, and to assist in combining a much greater quantity of the iron contained in the said solution of sulphate of iron with the prussic acid contained in the said solution of prussiate of potash, thus producing a chemically pure prussiate of iron cheaper than by any other known process. In the second formula I use the said solution of bichromate of potash for the same purpose, and also use the said solution of acetate of lead for the double purpose of an adulterator and in decomposing the said solution of prussiate of potash. I prepare the prussic acid of the same for receiving a greater quantity of the iron contained in the said solution of sulphate of iron, and also prepare this combination to receive a greater quantity of the oxygen contained in the said solution of bichromate of potash, thus producing a pure commercial Prussian blue, with a greater proportion of oxygen and iron, and consequently much cheaper than by any known process. It will be observed in both formulas, as above described, that on adding the said solution of sulphate of iron the precipitate produced is of a dirty greenish shade, but gradually becomes of a deep blue shade as the proper quantity of the said solution of sulphate of iron is added, and is beautifully brightened by the addition of the said diluted sulphuric acid.

In making the above-described colors I have observed no exact proportions in the use of the necessary materials, for the simple reason that the eye and judgment of the operator must guide him to a great extent in the manner, as well as the quantity necessary to use. I will add that the ordinary materials may be used to adulterate my colors in the ordinary way when desired.

What I claim as my invention, and desire to secure by Letters Patent, is—

The use of a solution of bichromate of potash and a solution of acetate of lead in the manner and for the purposes as herein described.

JOHN M. MERRYMON.

Witnesses:
 W. H. DE MOTTE,
 JOHN S. HOLLINGSHEAD.